United States Patent
Oya

(10) Patent No.: US 9,547,812 B2
(45) Date of Patent: Jan. 17, 2017

(54) PRINTING APPARATUS, METHOD OF CONTROLLING THE SAME AND STORAGE MEDIUM

(71) Applicant: CANON KABUSHIKI KAISHA, Tokyo (JP)

(72) Inventor: Hiroshi Oya, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/305,780

(22) Filed: Jun. 16, 2014

(65) Prior Publication Data

US 2014/0376015 A1 Dec. 25, 2014

(30) Foreign Application Priority Data

Jun. 21, 2013 (JP) ................................. 2013-131057

(51) Int. Cl.
| | | |
|---|---|---|
| *G03G 15/00* | (2006.01) | |
| *G06K 15/16* | (2006.01) | |
| *G06K 15/02* | (2006.01) | |
| *G06K 15/00* | (2006.01) | |

(52) U.S. Cl.
CPC ....... *G06K 15/4065* (2013.01); *G03G 15/6508* (2013.01); *G06K 15/16* (2013.01); *G03G 2215/00734* (2013.01)

(58) Field of Classification Search
None
See application file for complete search history.

(56) References Cited

U.S. PATENT DOCUMENTS

| | | | | |
|---|---|---|---|---|
| 4,614,423 A | * | 9/1986 | Yoshiura | 355/55 |
| 4,669,863 A | * | 6/1987 | Yoshiura et al. | 399/86 |
| 5,043,864 A | * | 8/1991 | Inuzuka et al. | 700/81 |

(Continued)

FOREIGN PATENT DOCUMENTS

| | | |
|---|---|---|
| CN | 102367108 A | 3/2012 |
| JP | 8-267851 A | 10/1996 |

(Continued)

OTHER PUBLICATIONS

European Search Report dated Nov. 19, 2014 issued in corresponding European Patent Application No. 14002048.8.

(Continued)

*Primary Examiner* — Beniyam Menberu
(74) *Attorney, Agent, or Firm* — Fitzpatrick, Cella, Harper & Scinto

(57) ABSTRACT

A printing apparatus, when a sheet is fed from a sheet feeding unit in a state where size information indicating the size of sheets stacked in the sheet feeding unit is not stored in a storage unit, detects and stores the size of the sheet during conveyance. The printing apparatus controls the execution of the print processing, without using size information in a case where a print instruction is received in a state where the size information is not stored, and using the size information in a case where the print instruction is received in a state where the size information is stored. Furthermore, the printing apparatus clears the size information stored in the storage unit when a particular key is operated in a state where the size information is stored while print processing is not being executed.

9 Claims, 5 Drawing Sheets

(56) References Cited

U.S. PATENT DOCUMENTS

| | | | |
|---|---|---|---|
| 5,689,759 A * | 11/1997 | Isemura et al. | 399/45 |
| 6,206,360 B1 * | 3/2001 | Urata et al. | 271/9.06 |
| 8,526,029 B2 | 9/2013 | Yasukawa et al. | |
| 8,644,718 B2 | 2/2014 | Oya | |
| 2005/0168765 A1 * | 8/2005 | Akune | G06K 15/00 358/1.13 |
| 2006/0002752 A1 * | 1/2006 | Ebuchi | G06F 3/1207 400/76 |
| 2006/0197825 A1 * | 9/2006 | Mohri | G03G 21/1892 347/240 |
| 2011/0007340 A1 * | 1/2011 | Masuyama | G03G 15/5075 358/1.14 |
| 2012/0002223 A1 * | 1/2012 | Tanaka | 358/1.9 |
| 2012/0057203 A1 * | 3/2012 | Maeda | G06F 3/1205 358/1.15 |
| 2012/0075656 A1 * | 3/2012 | Yasukawa et al. | 358/1.14 |
| 2012/0099148 A1 * | 4/2012 | Tokura | 358/1.15 |

FOREIGN PATENT DOCUMENTS

| | | |
|---|---|---|
| JP | 11-301079 A | 11/1999 |
| JP | 2002-19212 A | 1/2002 |
| JP | 2012-66537 A | 4/2012 |

OTHER PUBLICATIONS

Chinese Office Action dated Nov. 7, 2016 issued in corresponding Chinese Patent Application No. 201410273117.7.

\* cited by examiner

PRINTING APPARATUS, METHOD OF CONTROLLING THE SAME AND STORAGE MEDIUM

BACKGROUND OF THE INVENTION

Field of the Invention

The present invention relates to a printing apparatus, a method of controlling the same and a storage medium.

Description of the Related Art

In an image forming apparatus having a sheet feeding unit in which a plurality of differing sizes of sheets are stackable, setting of sizes of sheets stacked in the sheet feeding unit can be performed by various methods. For example, a method is known in which the image forming apparatus, in a case where it is provided, in the sheet feeding unit, with a sensor by which stacked sheet sizes are detectable, sets (stores) the sheet size detected using this kind of sensor as the sheet size corresponding to that sheet feeding unit.

On the other hand, there exist image forming apparatuses that are not provided with this kind of a sensor in order to reduce manufacturing costs. In these kinds of image forming apparatuses, for example, there is a method that is known in which a sensor, by which the size of sheets being conveyed is measurable, is provided and the size measured by this kind of sensor is set for the sheet feeding unit in accordance with the completion of conveyance of the sheets (printing completion) (Japanese Patent Laid-Open No. 11-301079). Also, in Japanese Patent Laid-Open No. 8-267851, a method is disclosed in which, upon power activation, or after opening and closing of the sheet feeding unit, because there is the possibility that the sheets stacked in the sheet feeding unit were replaced with the sheets of a differing size (the sheet size changed), size information that was set (stored) is updated.

In this kind of image forming apparatus, when print processing is performed based on a print instruction, in a case where the sheet size designated by the print instruction does not match a stored sheet size, a warning message is displayed which indicates that effect, and the user is prompted to replace the sheets with those of an appropriate size.

In image forming apparatuses (printing apparatuses), there are many cases where even if opening and closing of the sheet feeding unit is performed, sheets of the same size as before are supplied to the sheet feeding unit. For this reason, cases in which the sheet size information stored in the printing apparatus is updated only upon power activation without updating the sheet size information upon opening and closing of the sheet feeding unit are possible.

This kind of printing apparatus, when the sheets stacked in the sheet feeding unit are replaced by the user with sheets of a differing size in a state where sheet size information is stored, cannot change the sheet size information appropriately unless it enters an powered off state. As a consequence, when print processing is executed after replacement of the sheets, a print operation is suspended due to a mismatch between the stored sheet size and the sheet size designated by the print instruction, and a warning message prompting replacement of the sheets will be displayed. Because of this, convenience for the user is reduced.

SUMMARY OF THE INVENTION

The present invention was conceived in view of the above described issues. The present invention provides a technique of, in a printing apparatus that detects the size of a sheet during conveyance of the sheet and stores it, executing print processing without suspending even if sheets stacked in a sheet feeding unit are replaced with sheets of a differing size.

According to one aspect of the present invention, there is provided a printing apparatus comprising: a detection unit configured to detect, when a sheet is fed from a sheet feeding unit of the printing apparatus, a size of the sheet during conveyance; a storing unit configured to store information indicating the size detected by the detection unit in a storage unit of the printing apparatus, as size information indicating a size of a sheet stacked in the sheet feeding unit; a control unit configured to control, in a case where execution of print processing is instructed in a state where the size information is stored in the storage unit, the execution of the print processing using the size information, and to control, in a case where execution of print processing is instructed in a state where the size information is not stored in the storage unit, the execution of the print processing without using the size information; and a clearing unit configured to clear, in a case where a particular key is operated by a user in the state where the size information is stored in the storage unit while print processing is not being executed, the size information stored in the storage unit.

According to another aspect of the present invention, there is provided a method of controlling a printing apparatus, comprising the steps of: detecting, when a sheet is fed from a sheet feeding unit of the printing apparatus, a size of the sheet during conveyance; storing information indicating the size detected in the detecting step in a storage unit of the printing apparatus, as size information indicating a size of a sheet stacked in the sheet feeding unit; controlling, in a case where execution of print processing is instructed in a state where the size information is stored in the storage unit, the execution of the print processing using the size information, and controlling, in a case where execution of print processing is instructed in a state where the size information is not stored in the storage unit, the execution of the print processing without using the size information; and clearing, in a case where a particular key is operated by a user in the state where the size information is stored in the storage unit while print processing is not being executed, the size information stored in the storage unit.

According to still another aspect of the present invention, there is provided a computer-readable storage medium storing a computer program for causing a computer to execute steps of a method of controlling a printing apparatus, the method comprising steps of: detecting, when a sheet is fed from a sheet feeding unit of the printing apparatus, a size of the sheet during conveyance; storing information indicating the size detected in the detecting step in a storage unit of the printing apparatus, as size information indicating a size of a sheet stacked in the sheet feeding unit; controlling, in a case where execution of print processing is instructed in a state where the size information is stored in the storage unit, the execution of the print processing using the size information, and controlling, in a case where execution of print processing is instructed in a state where the size information is not stored in the storage unit, the execution of the print processing without using the size information; and clearing, in a case where a particular key is operated by a user in the state where the size information is stored in the storage unit while print processing is not being executed, the size information stored in the storage unit.

By virtue of the present invention, a technique of, in a printing apparatus that detects the size of a sheet during conveyance of the sheet and stores it, executing print processing without suspending even if sheets stacked in a sheet feeding unit are replaced with sheets of a differing size can be provided.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Hardware Configuration of a Printing Apparatus 101>

Figure 1:
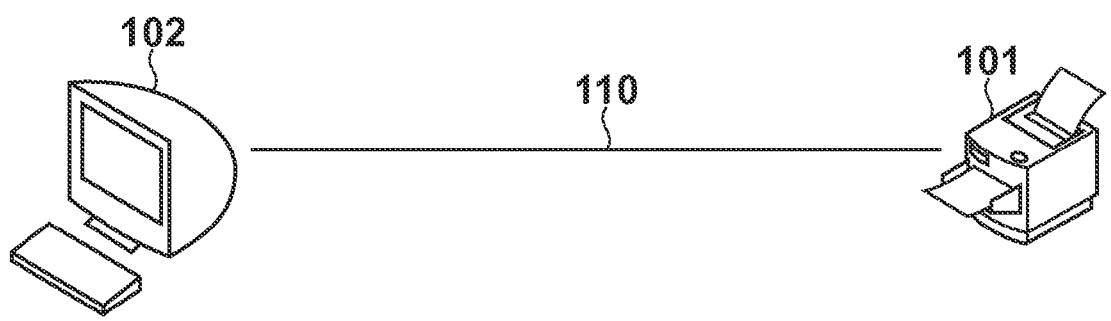
FIG. 1 is a view for illustrating an example configuration of a network including a printing apparatus 101 according to an embodiment.

FIG. 1 is a view for illustrating an example network configuration including the printing apparatus 101 according to an embodiment. As shown in FIG. 1, the printing apparatus 101 is connected to a network 110 such as a LAN, and is connected with a PC 102 via the network 110 so as to be able to perform communication. However, the printing apparatus 101 may be connected to the PC 102 by a USB connection via a USB cable rather than by the network 110. A user can perform settings relating to print processing using an application operating on the PC 102 by operating the PC 102, and can cause the PC 102 to transmit an execution instruction for print processing as well as these settings to the printing apparatus 101. The printing apparatus 101 is capable of receiving an execution instruction for print processing from an external apparatus such as the PC 102 via the network 110 and not just via an operation unit (an operation unit 340 of FIG. 3).

Figure 2:
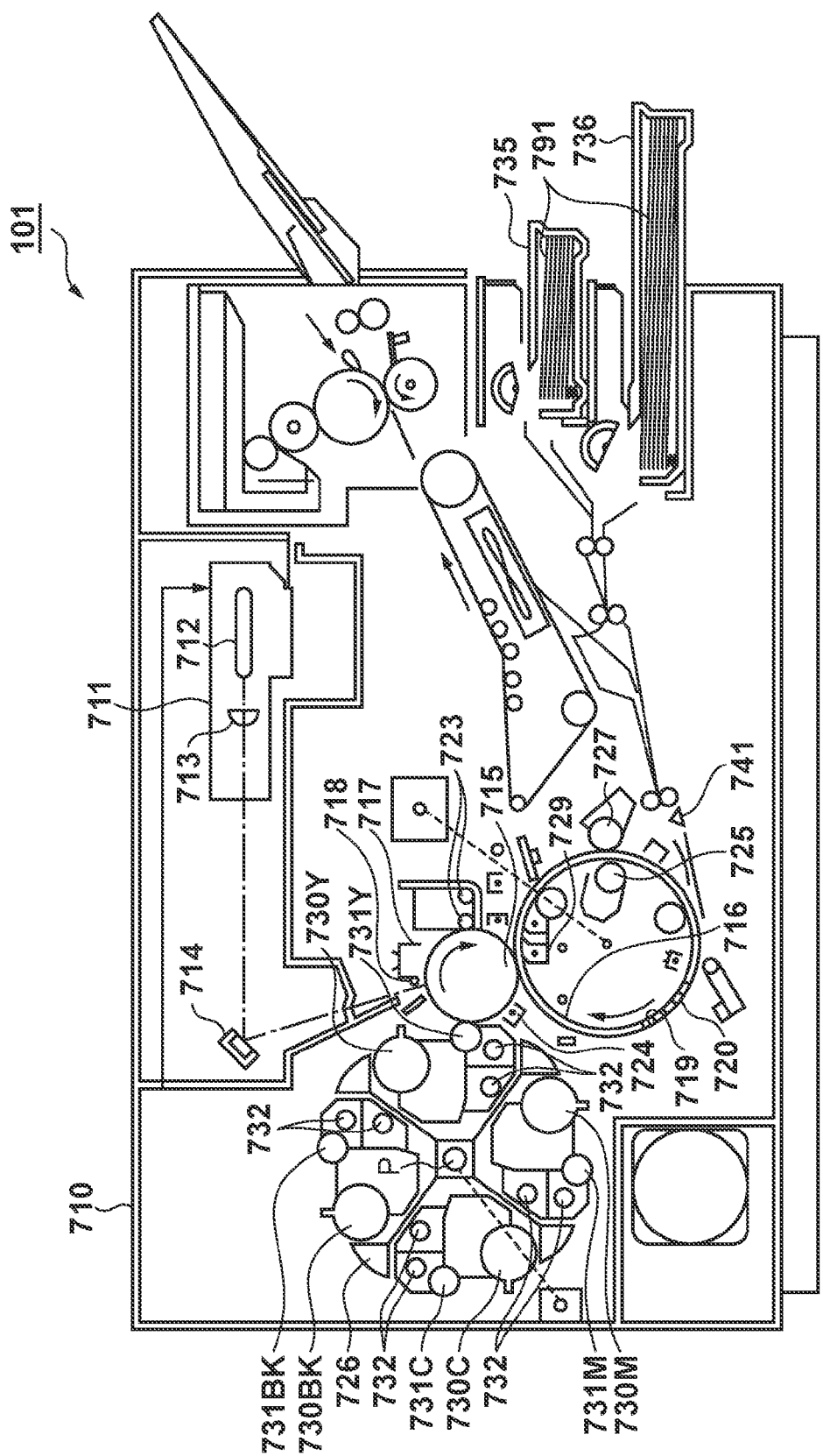
FIG. 2 is a cross-section view for illustrating an example of a hardware configuration of the printing apparatus 101 according to an embodiment.

FIG. 2 is a cross-section view for illustrating an example of a hardware configuration of the printing apparatus 101 according to the present embodiment. A scanner 711 is provided with a laser output unit (not shown) for converting an image signal into an optical signal, a polygon mirror 712 that is a polyhedron (an eight sided object) having a plurality of reflecting surfaces, a motor (not shown) for rotating the polygon mirror 712, and an f/θ lens (imaging lens) 713, and the like. The scanner 711 is configured so that a laser beam corresponding to an original image is irradiated onto a surface of a photosensitive drum 715 by modulating the laser beam emitted from the laser output unit with an image signal corresponding to the original image. The laser beam emitted from the laser output unit is reflected by one of the reflecting surfaces of the polygon mirror 712, passes through the f/θ lens 713 and a reflecting mirror 714, and scans in a line form the surface of the photosensitive drum 715 which is rotating in the arrow direction. With this, the surface of the photosensitive drum 715 is exposed, and an electrostatic latent image corresponding to the original image is formed on the surface of the photosensitive drum 715.

In the periphery of the photosensitive drum 715, a primary charger 717, a full surface exposure lamp 718, cleaner units 723 for retrieving developing material (toner) remaining on the surface of the photosensitive drum 715 without being transferred to the paper (sheet), a pre-transfer charger 724, and a developing unit 726 are arranged.

The developing unit 726 forms a toner image on the surface of the photosensitive drum 715 by developing the electrostatic latent image formed on the surface of the photosensitive drum 715 with toner. In the periphery of a center axis P of the developing unit 726 are arranged developing sleeves 731Y, 731M, 731C and 731Bk, toner cartridges 730Y, 730M, 730C, 730Bk, and screws 732. The toner cartridges 730Y, 730M, 730C, 730Bk store toner of yellow (Y) color, magenta (M) color, cyan (C) and black (Bk) color respectively. The screws 732 transfer the toner. The developing sleeves 731Y, 731M, 731C and 731Bk abut the photosensitive drum 715, and develop the electrostatic latent image by supplying toner to the surface of the photosensitive drum 715 from the toner cartridges 730Y, 730M, 730C, 730Bk.

The printing apparatus 101 is provided with a door 710 that a user is able to open and close. By opening and closing the door 710, the user is able to replace the toner cartridges 730Y, 730M, 730C, 730Bk located directly under the door 710. In the periphery of a transfer roller 716, which is a transfer charger, are arranged an actuator plate 719, a position sensor 720, a transferring drum cleaner 725, a sheet pressing roller 727 and a static eliminator 729.

In sheet feeding units (paper feed cassettes) 735 and 736, sheets 791 are accommodated and stacked. In the present embodiment, a sensor for detecting the size of the sheets 791 stacked in the sheet feeding units 735 and 736 is not arranged in the sheet feeding units 735 and 736. For this reason, the sheet feeding units 735 and 736 do not automatically detect the sizes of the stacked sheets 791. Also, a sensor for detecting the existence or absence of stacked sheets is not arranged in the sheet feeding units 735 and 736. For this reason, the sheet feeding units 735 and 736 do not automatically detect that stacked sheets 791 are not remaining (that they ran out).

In the printing apparatus 101, a sheet length detection sensor 741 for detecting the size of a sheet being conveyed is further arranged on a conveyance path on which a sheet 791 fed from the sheet feeding units 735 and 736 is conveyed. The sheet length detection sensor 741 detects sheets 791 conveyed on the conveyance path. A CPU 301 (FIG. 3) is able to detect a length (size) of a sheet 791 in a conveyance direction based on output from the sheet length detection sensor 741. More specifically, the CPU 301 is able to detect the size of a sheet 791 in the conveyance direction based on a conveying speed of the sheet 791 and a time period over which the sheet 791 is detected.

Figure 3:
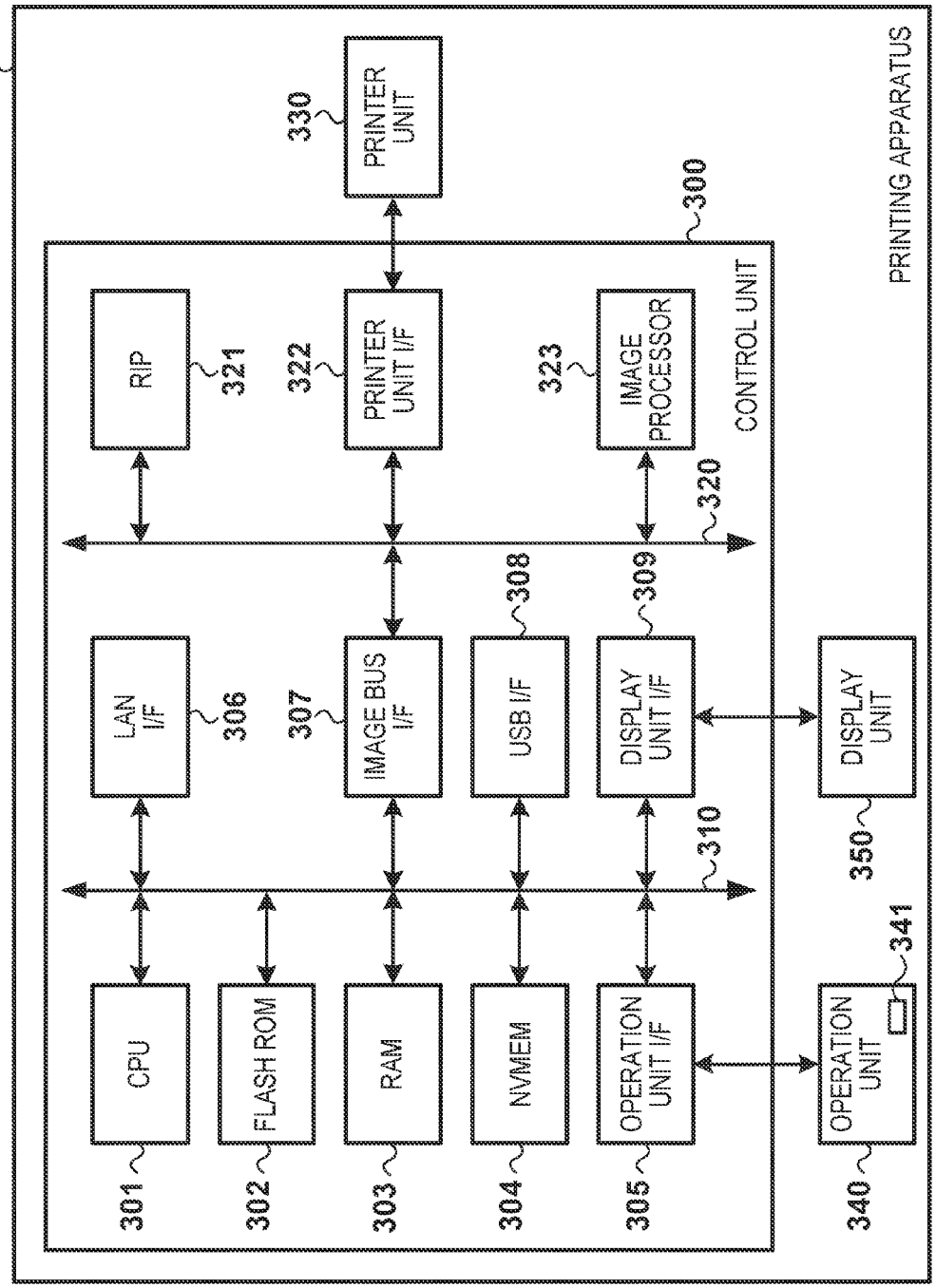
FIG. 3 is a block diagram for showing an example of a hardware configuration of the printing apparatus 101 according to an embodiment.

Next, FIG. 3 is a block diagram for showing a hardware configuration of the printing apparatus 101 according to the present embodiment. The printing apparatus 101 is provided with a control unit 300, and a printer unit 330, the operation unit 340 and a display unit 350 which are connected to the control unit 300. Note that the printing apparatus 101 may be further provided with a device not shown in FIG. 3.

The printer unit 330 functions as an image output device for printing (outputting) an image onto a sheet based on image data. The printer unit 330 is a printer of an electrophotographic type, an ink-jet type, or the like, that prints an image onto a sheet based on raster image data. In the present embodiment, the printer unit 330 is an printer of the electrophotographic type. The operation unit 340 has an input unit such as a keyboard, a touch panel, and the like, and receives instructions from a user. The display unit 350 displays various information such as the information that the user input, messages notified to the user, statuses of the printing apparatus 101, processing results in the printing apparatus 101, and the like.

Also, in the operation unit 340, a Paper key 341 is arranged as a hardware key. Normally, the Paper key 341 is used, when print processing is suspended due to the sheets stacked in the sheet feeding units 735 and 736 running out, for instructing the printing apparatus 101 that print processing should be resumed, after the user supplied sheets. Also, the Paper key 341 is used, while a print instruction (print job) is not received and print processing is not being executed, for clearing (deleting) size information, indicating the size of the sheets accommodated in the sheet feeding units 735 and 736, which is stored in an NVMEM 304. In this way, the Paper key 341 is an example of a particular key operated by a user to clear sheet size information stored in a storage unit (the NVMEM 304) while print processing is not being executed.

The control unit 300 is provided with a system bus 310 and an image bus 320, and various devices are connected to each of these buses. To the system bus 310 are connected the CPU 301, a flash ROM 302, a RAM 303, the NVMEM 304, and an operation unit interface (I/F) 305. To the system bus 310 are connected a LAN I/F 306, an image bus I/F 307, a USB I/F 308, and a display unit I/F 309. In addition, to the image bus 320 are connected the image bus I/F 307, a raster image processor (RIP) 321, a printer unit I/F 322, and an image processor 323.

The CPU 301 is a processor for controlling overall operations of the printing apparatus 101. The flash ROM 302 is a rewritable and non-volatile memory in which various control programs with which the CPU 301 controls operation of the printing apparatus 101 are stored. The RAM 303 provides a system work memory for operation of the CPU 301. The RAM 303 is used as a program memory into which control programs read out from the flash ROM 302 are loaded, and as an image memory in which image data that becomes a printing target in the printer unit 330 is temporarily stored. The NVMEM 304 is a non-volatile memory in which setting information and the like are stored. However, the NVMEM 304 may be substituted with another non-volatile storage device such as a hard disk drive (HDD), or the like. Note, in the present embodiment, that the NVMEM 304 is an example of a storage unit in which size information indicating the size of the sheets stacked in the sheet feeding unit is stored.

The operation unit I/F 305 is an interface connecting the operation unit 340 and the system bus 310, and it transfers control information from the CPU 301 to the operation unit 340 via the system bus 310. Also, the operation unit I/F 305 transfers information that the user inputs using the operation unit 340 via the system bus 310 to the CPU 301.

The LAN I/F 306 is connected to the network (LAN) 110, and performs transmission and reception of device information, image data, print processing execution instructions, and the like, with external apparatuses via the network. The USB I/F 308 is an interface to which external apparatuses such as the PC 102 are connectable by a USB connection. The image bus I/F 307 is an interface connecting the system bus 310 and the image bus 320 over which image data is transferable at high speed, and is a bus bridge for converting data configurations. The image bus 320 is configured to be a PCI bus or IEEE 1394 bus. The display unit I/F 309 is an interface connecting the display unit 350 and the system bus 310. The display unit I/F 309 transfers, to the display unit 350, data corresponding to control information and information to be displayed, received from the CPU 301 via the system bus 310.

The RIP 321 interprets vector data such as page description language (PDL) code into bitmap image data. The printer unit I/F 322 is an interface connecting the printer unit 330 and the control unit 300, and it performs image data conversion between synchronous and asynchronous systems, transmission and reception of control commands, supply of electric power, and the like. The image processor 323 performs corrections, processing and editing for input image data, as well as gamma correction and resolution transformation for printed output image data, and the like. The image processor 323 further performs image data rotation, compression/decompression processing such as JPEG for multi-valued image data, and compression/decompression processing such as JBIG, MMR, MH, or the like for binary image data.

<Setting Processing of Sheet Size Information>

Next, explanation will be given for the operation of the printing apparatus 101 according to the present embodiment, with reference to FIGS. 4A and 4B. Note, in the printing apparatus 101, that the print operation by the printer unit 330 is executed under control by the CPU 301.

The printing apparatus 101, as described above, is provided with a sheet length detection sensor 741 for detecting the size of sheets conveyed on a conveyance path, fed from the sheet feeding units 735 and 736. The printing apparatus 101 is capable of detecting the size in the conveyance direction of a sheet when the sheet is being conveyed, based on information output from this sensor. The printing apparatus 101 is able to set the size of sheets stacked in the sheet feeding unit 735 or 736 automatically based on size detection results for the sheet being conveyed, even when the size of the sheets stacked in the sheet feeding unit 735 or 736 is not set by a user in advance via the operation unit 340.

Figure 4:
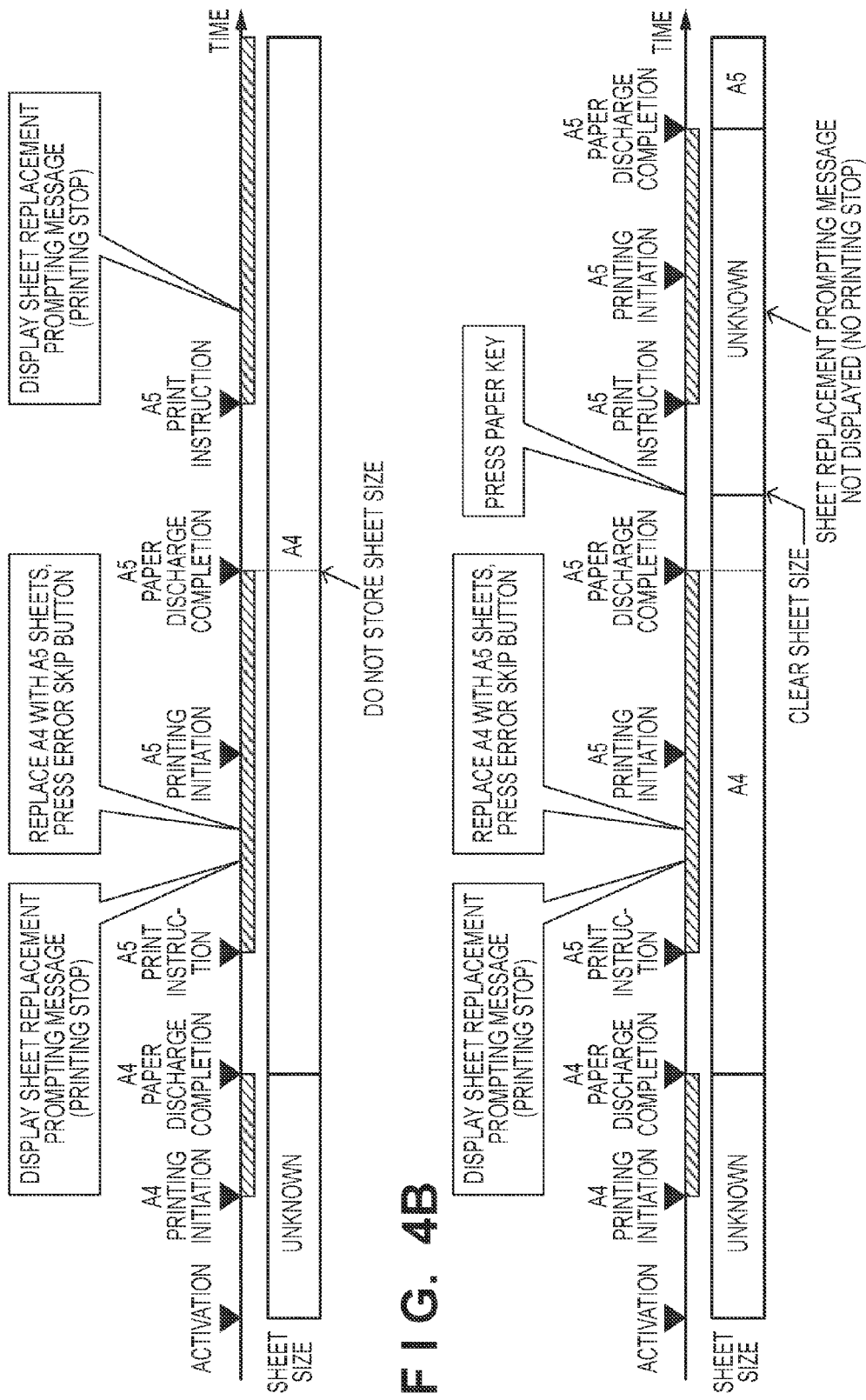
FIGS. 4A and 4B are schematic diagrams for showing examples of operation of the printing apparatus 101 according to an embodiment.

FIGS. 4A and 4B show an example of operation of the printing apparatus 101 according to the present embodiment. In FIGS. 4A and B are showing the sheet size information, that the printing apparatus 101 stores (saves), indicating the size of the sheets stacked in the sheet feeding unit 735 or 736 (hereinafter, explanation is given for the sheet feeding unit 735). The printing apparatus 101 stores sheet size information in a state where it is stored in the NVMEM 304. Note that "unknown" shown in FIGS. 4A and B corresponds to a state where the sheet size information is cleared (a not yet set state), and indicates a state where the size of the sheets stacked in the sheet feeding unit 735 is not detected and the printing apparatus 101 does not store the size. Also, upon activation of an electric power supply of the printing apparatus 101, the stored sheet size information is cleared. Note, in present embodiment, that it is assumed that the printing apparatus 101 does not clear the stored sheet size information even when the sheet feeding units 735 and 736 are opened and closed by the user.

As shown in FIG. 4A, the printing apparatus 101 initiates printing using a sheet of an A4 size in accordance with a print instruction (print job) after activation of the power supply. Note that, when feeding a sheet from the sheet feeding unit 735 in a state where the printing apparatus 101 does not store the sheet size information, the printing apparatus 101 performs print processing by feeding a sheet from the sheet feeding unit 735 independently of the size of the sheet designated by the print instruction. The printing apparatus 101 detects the size of a sheet while the sheet is being conveyed as described above. After this, the printing apparatus 101 stores the size of the sheets stacked in the sheet feeding unit 735, by storing the detected sheet size into the NVMEM 304 at a timing when the conveyance is completed (or at a timing when the print processing is completed). Note that, in a case of feeding a plurality of sheets consecutively in accordance with a print instruction, the printing apparatus 101 may store the sheet size in accordance with the completion of conveyance (paper discharge) of all of the sheets.

After this, the printing apparatus 101 executes the print processing using the stored sheet size information upon execution once again of print processing in accordance with a print instruction (print job). More specifically, the printing apparatus 101 determines whether or not the sheet size designated by the print instruction and the size (A4) of sheets stacked in the sheet feeding unit 735 that the printing apparatus 101 stores match, and controls the execution of the print processing in accordance with that determination result. For example, in a case where a mismatch occurs between the stored sheet size and the sheet size designated by the print instruction, the printing apparatus 101 suspends the execution of the print processing, and displays a message prompting replacement of the sheets stacked in the sheet feeding unit 735 on the display unit 350. Alternatively, the printing apparatus 101 performs the print processing such that the image does not protrude from the sheet by adjusting the size of the image of the printing target.

In FIG. 4A, a case is shown in which the printing apparatus 101, after the completion of the print processing for sheets of the A4 size, receives a print instruction designating the usage of sheets of an A5 size. In such a case, due to a mismatch occurring between the stored sheet size (A4) and the sheet size designated by the print instruction (A5), the printing apparatus 101 suspends the execution of the print processing and displays a message prompting replacement to sheets of the A5 size on the display unit 350. Here, even in a case where, prior to receiving the print instruction, the stacked sheets are replaced from sheets of the A4 size to sheets of the A5 size, the printing apparatus 101 will suspend the execution of the print processing and display the above message. This is because a sensor for detecting the size and the existence or absence of the sheets in the sheet feeding unit 735 is not arranged, and the printing apparatus 101 cannot recognize that the sheets were replaced.

In such a case where the execution of the print processing is suspended, the user is able to cause the printing apparatus 101 to ignore the error (sheet error) due to the mismatch of sheet sizes and to resume the print processing, by pressing the error skip button (not shown) arranged on the operation unit 340. In this case, by resuming the print processing without performing replacement of the sheets, it is possible to print the image for the A5 size on a sheet of the A4 size. Alternatively, as illustrated in FIG. 4A, the user is able to replace the sheets from sheets of the A4 size stacked in the sheet feeding unit 735 to sheets of the A5 size, and cause the printing apparatus 101 to resume the print processing by replacing.

However, in a case of ignoring the error to execute the print processing as described above, the printing apparatus 101 does not store newly a sheet size upon the completion of the print processing. For this reason, as illustrated in FIG. 4A, in a case where after that once again a print instruction designating the usage of sheets of the A5 size is received, the printing apparatus 101 suspends the print processing and displays a message prompting replacement of the sheets dues to the mismatch with the sheet size stored (A4). As a result, even if the user replaces the sheets stacked in the sheet feeding unit 735 to sheets of an appropriate size, the execution of the print processing is suspended once again. As a consequence, in addition to productivity deteriorating, convenience of the user deteriorates.

So, in the present embodiment, the printing apparatus 101 provides an arrangement for avoiding unnecessary suspension of the print processing in a case of the replacement of the sheets. More specifically, as illustrated in FIG. 4B, when the Paper key 341 is operated by the user in a state where the sheet size information is stored while print processing is not being executed, the printing apparatus 101 clears (deletes) the sheet size information saved in the NVMEM 304. In this way, the printing apparatus 101, by clearing the stored sheet size information, is in a state where the sheet size information is not stored when a print instruction is subsequently received. When initiating print processing in this state, the printing apparatus 101 feeds a sheet from the sheet feeding unit 735 independently of the size of sheets designated by the print instruction and executes the print processing feeding. As a result, as illustrated in FIG. 4B, even if a print instruction designating the usage of sheets of the A5 size is received after the Paper key 341 is operated, in addition to being able to avoid the print processing from being suspended, the message prompting the replacement of the sheets is prevented from being displayed.

<Print Processing Based on Sheet Size Information>

Figure 5:
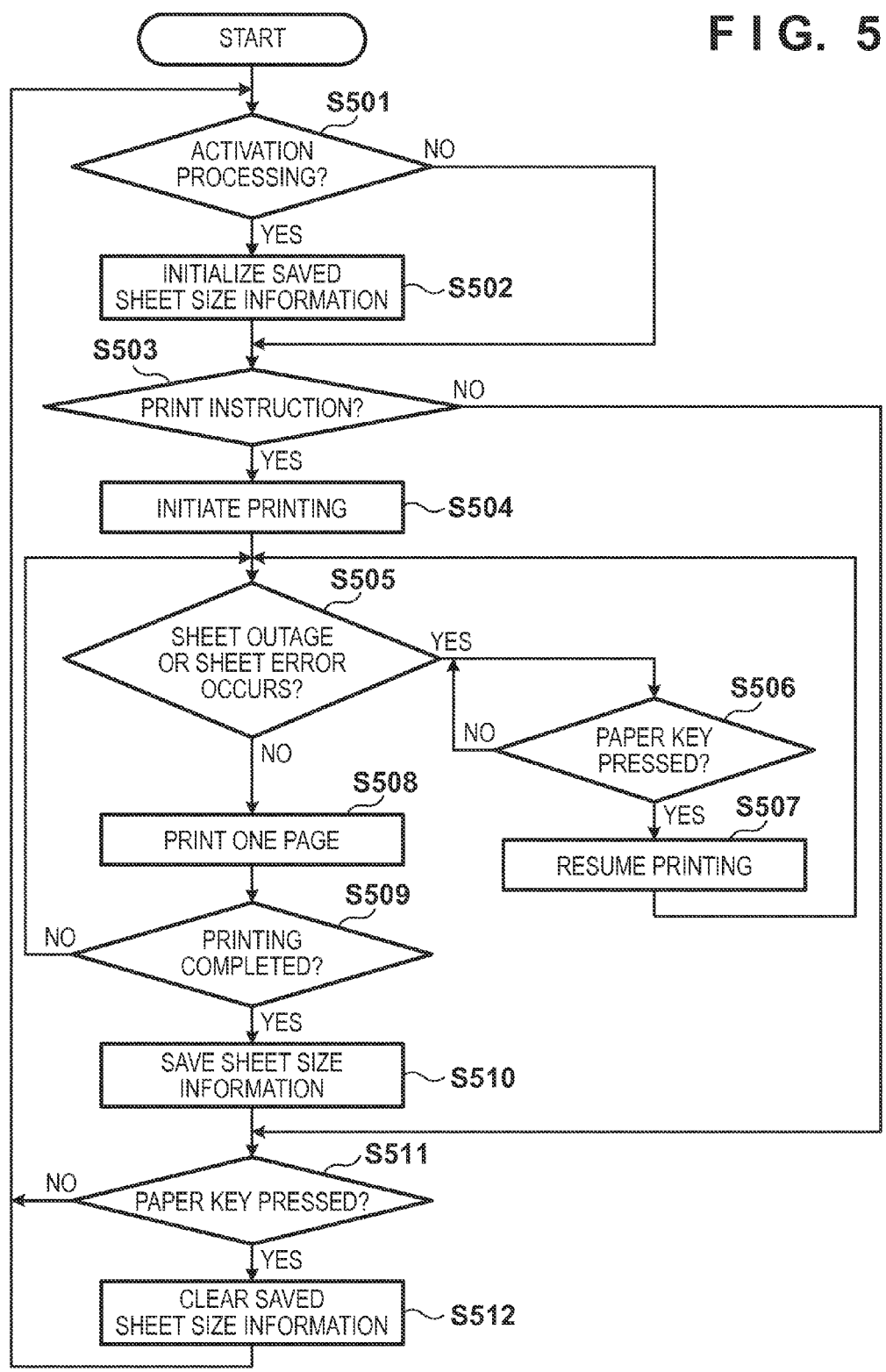
FIG. 5 is a flowchart for showing a procedure of print processing and sheet size information storing processing executed by the printing apparatus 101 according to an embodiment.

Next, explanation will be given for a procedure of print processing based on the sheet size information executed by the printing apparatus 101 with reference to the flowchart shown in FIG. 5. The processing shown in the flowchart is realized on the printing apparatus 101 by the CPU 301 reading out a control program stored in the flash ROM 302, loading it into the RAM 303 and executing the loaded program.

In step S501, the CPU 301 determines whether or not the printing apparatus 101 is currently executing activation processing, and in a case where the printing apparatus 101 is currently executing activation processing, the CPU 301 advances the process to step S502, while in a case where the printing apparatus 101 is not currently executing activation processing, the CPU 301 advances the process to step S503. In step S502, the CPU 301, in a case where the printing apparatus 101 is currently executing the activation processing, clears (deletes) the sheet size information saved in the NVMEM 304. Here, the activation processing corresponds to initialization processing when a power switch (not shown) or the like of the operation unit 340 is operated and the printing apparatus 101 is activated from a state where the operation is stopped in a powered off state, or initialization processing when the printing apparatus 101 is activated from a state where operation is stopped in a power saving state. By the processing of step S502, even if the sheets stacked in the sheet feeding units 735 and 736 are replaced by the user with sheets of a differing size while the printing apparatus 101 is in a powered off state or a power saving state, print processing can be avoided from being suspended unnecessarily after that.

The CPU 301, after deleting the sheet size information saved in the NVMEM 304 in step S502, determines whether or not an execution instruction (print instruction) for print processing has been received in step S503. The print instruction is receivable as a print job, via the USB I/F 308 or the LAN I/F 306 from the PC 102, or from the operation unit 340 in response to an operation of the user. The CPU 301, in a case where a print instruction has not been received, advances the process to step S511, and in a case where a print instruction has been received, advances the process to step S504.

In step S504, the CPU 301, by instructing the execution of print processing based on the print instruction (print job) to the printer unit 330 via the printer unit I/F 322, initiates the execution of the print processing. In this print instruction (print job), the size of the sheets used for the printing, and the sheet feeding unit that should be used as the feed source of sheets can be designated as print settings. Below, it is assumed that the sheet feeding unit 735 is designated as the feed source of sheets by the print setting.

When the CPU 301, via the printer unit I/F 322, makes an instruction for the execution of print processing to the printer unit 330, a signal indicating that feeding of sheets from the sheet feeding unit 735 is initiated is transmitted from the printer unit 330 to the CPU 301. When a sheet is fed from the sheet feeding unit 735 due to the execution of the print processing and the sheet is being conveyed on the conveyance path, the size of the sheet being conveyed is detected by the sheet length detection sensor 741 arranged on the conveyance path. The printer unit 330 transfers output information from the sheet length detection sensor 741 via the printer unit I/F 322 to the CPU 301. The CPU 301 detects the size of the sheets being conveyed based on the output information from the sheet length detection sensor 741, and holds information indicating the detected sheet size in the RAM 303 until the completion of the print processing. Also, in a case where the printer unit 330 determines that sheets are not fed from the sheet feeding unit 735 to the conveyance path, and that sheets stacked in the sheet feeding unit 735 ran out, it notifies the CPU 301 of that. Thus, the CPU 301 is able to detect that running out of sheets occurred while the print processing is in progress.

When the execution of print processing is initiated, the CPU 301, in step S505, determines whether or not running out of sheets, or a sheet error occurred. Here, the sheet error corresponds to an error due to a mismatch between the sheet size designated by the print instruction, and the size of the sheets stacked in the designated sheet feeding unit 735. Note that, in a case where sheet size information is not saved in the NVMEM 304, the CPU 301 continues the print processing independently of the designated sheet size. When the CPU 301, in step S505, determines that running out of sheets or a sheet error occurred, the CPU 301 advances the process to step S506, and otherwise, the CPU 301 advances the process to step S508. In step S508, the CPU 301 causes the printer unit 330 to execute the printing of an image of one page, and advances the process to step S509.

In step S506, the CPU 301 determines whether or not the Paper key 341 is pressed by a user. In a case were running out of sheets occurred, the CPU 301 displays a message prompting supplying of sheets to the sheet feeding unit 735 on the display unit 350. The user is able to cause the printing apparatus 101 to resume the execution of the print processing, by supplying sheets of a size designated by the print instruction to the sheet feeding unit 735 and pressing the Paper key 341. In such a case, if the Paper key 341 is pressed, the CPU 301 determines that sheets are supplied to the sheet feeding unit 735, and in step S507, controls the printer unit 330 so as to resume the execution of the print processing.

Also, in a case where a sheet error occurred, the CPU 301, as described above, displays, on the display unit 350, a message prompting the replacement of the sheets stacked in the sheet feeding unit 735 to sheets of a size designated by the print instruction. The user is able to cause the printing apparatus 101 to resume the execution of the print processing, by performing the replacement of sheets and pressing the Paper key 341. In such a case, if the Paper key 341 is pressed, the CPU 301 determines that the sheets stacked in the sheet feeding unit 735 are replaced, and in step S507, controls the printer unit 330 so as to resume the execution of the print processing.

In a case where the Paper key 341 is pressed, unlike a case where the error skip button is pressed as described above, the CPU 301 resumes the execution of the print processing using the sheet size designated by the print instruction. For this reason, in a case where the size of the sheets fed from the sheet feeding unit 735 still are not matching the sheet size designated by the print instruction, the CPU 301 repeats the processing from step S505 to step S507.

After step S507, the CPU 301 returns the process to step S505, and once again executes the above described determination processing. As a consequence, when determining that running out of sheets or a sheet error does not occur (running out of sheets or a sheet error is cancelled), the CPU 301 advances the process to step S508, and causes the printer unit 330 to execute the printing of an image of one page. After that, in step S509, the CPU 301 determines whether or not the printing of the number of pages designated by the print instruction is completed and the print processing is completed. When the CPU 301 determines that the print processing is not completed, the CPU 301 returns the process to step S505. On the other hand, the CPU 301 advances the process to step S510 when it determines that the print processing is completed.

In step S510, the CPU 301 saves the sheet size information corresponding to the sheet size detected while the print processing is in progress into the NVMEM 304 as size information indicating the size of the sheets stacked in the sheet feeding unit 735. Note that, in FIGS. 4A and 4B, examples are shown in which in cases where a plurality of sheets are fed consecutively from the sheet feeding unit 735 due to a print instruction and printing is performed, sheet size information is saved at a timing when discharge of all of the plurality of sheets has completed. However, the sheet size information may be saved at a timing when discharge of one sheet has completed.

Next, when advancing the process from step S503 or step S510 to step S511, the CPU 301 monitors whether or not the Paper key 341 is pressed while the print processing is not being executed based on a print instruction. In step S511, the CPU 301 clears the sheet size information saved in the NVMEM 304 when it detects that the Paper key 341 is pressed, as described above. In such a case, the CPU 301 may delete the sheet size information corresponding to each of the sheet feeding units 735 and 736 that the printing apparatus 101 is provided with. Alternatively, in a case where opening and closing of the sheet feeding units 735 and 736 is detectable, the CPU 301 may delete the sheet size information corresponding to the sheet feeding unit that was opened and closed last. In such a case, it is possible to clear only sheet size information corresponding to a sheet feeding unit for which the possibility that sheets were replaced is high, and convenience of the user can be improved even more.

As explained above, the printing apparatus 101 according to the present embodiment, when a sheet is fed from the sheet feeding unit 735 in a state where the size information indicating the size of the sheets stacked in the sheet feeding unit 735 is not saved in the NVMEM 304, detects and saves the size of sheets which are being conveyed. The printing apparatus 101 controls the execution of the print processing without using size information in a case where it receives a print instruction in a state where the size information is not saved, and the printing apparatus 101 controls the execution of print processing using the size information in a case where a print instruction is received in a state where the size information is saved. Furthermore, the printing apparatus 101 clears the size information saved in the NVMEM 304 when the Paper key 341 is operated in a state where the size information is saved while print processing is not being executed.

Thus, in a printing apparatus 101 of a type that cannot detect the sheet size in a sheet feeding unit, but that detects the sheet size during conveyance of a sheet, even if the sheets stacked in the sheet feeding unit 735 are replaced to sheets of a differing size, print processing after that can be executed without suspension. For this reason, a message prompting that the sheets stacked in the sheet feeding unit 735 be replaced to sheets of a differing size is not displayed on the display unit 350. Accordingly, by virtue of the present embodiment, in a case where the replacement of sheets is performed, execution of print processing in the printing apparatus 101 is possible without bothering the user, and it is possible to improve the convenience of the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131057, filed Jun. 21, 2013, which is hereby incorporated by reference herein in its entirety.

What is claimed is:

1. A printing apparatus comprising:
   a detector that detects, when a sheet is fed from a sheet feeding unit of the printing apparatus, a size of the sheet during conveyance;
   a memory that stores information indicating the size detected by the detector in a storage unit of the printing apparatus, as size information indicating a size of a sheet stacked in the sheet feeding unit;
   a controller that controls, in a case where execution of print processing is instructed in a state where the size information is stored in the memory, the execution of the print processing using the stored size information; and
   a clearer that clears, in a case where a particular key is operated by a user while print processing is not being suspended, the size information stored in the memory,
   wherein, in a case where the particular key is operated by a user while print processing is being suspended, the clearer does not clear the size information stored in the memory and the controller resumes the suspended print processing.

2. The printing apparatus according to claim 1, wherein the controller:
   in a case where execution of print processing is instructed in the state where the size information is stored in the memory, controls the execution of the print processing in accordance with whether or not a size of a sheet designated by an execution instruction of the print processing and the size indicated by the stored size information match; and
   in a case where execution of print processing is instructed in the state where the size information is not stored in the memory, causes a sheet to be fed from the sheet feeding unit independently of the size of the sheet designated by the execution instruction of the print processing and executes the print processing.

3. The printing apparatus according to claim 1, wherein, in a case where execution of print processing is instructed in the state where the size information is stored in the memory, the controller:
   causes a sheet to be fed from the sheet feeding unit and executes the print processing, if a size of a sheet designated by an execution instruction of the print processing and the size indicated by the stored size information match; and
   suspends execution of the print processing and prompts a user to replace a sheet stacked in the sheet feeding unit, if the size of the sheet designated by the execution instruction of the print processing and the size indicating the stored size information do not match.

4. The printing apparatus according to claim 1, wherein the clearer clears, when the printing apparatus is activated from a state where operation is stopped in a powered off state or from a power saving state, the size information stored in the memory.

5. The printing apparatus according to claim 1, wherein the memory stores, in a case where a plurality of sheets are fed consecutively from the sheet feeding unit due to execution of the print processing, size information indicating a size detected by the detector upon completion of discharge of all the plurality of sheets.

6. The printing apparatus according to claim 1, wherein a sensor for detecting a size of a sheet during conveyance is arranged on a conveyance path over which a sheet fed from the sheet feeding unit is conveyed, and
   the detector detects the size of the sheet during conveyance, based on an output from the sensor when a sheet passes a position at which the sensor is arranged on the conveyance path.

7. The printing apparatus according to claim 1, wherein the particular key is a hardware key, and which is arranged on an operation unit of the printing apparatus.

8. A method of controlling a printing apparatus, comprising the steps of:
  detecting, when a sheet is fed from a sheet feeding unit of the printing apparatus, a size of the sheet during conveyance;
  storing information indicating the size detected in the detecting step in a storage unit of the printing apparatus, as size information indicating a size of a sheet stacked in the sheet feeding unit;
  controlling, in a case where execution of print processing is instructed in a state where the size information is stored in the storage unit, the execution of the print processing using the stored size information; and
  clearing, in a case where a particular key is operated by a user while print processing is not being suspended, the size information stored in the storage unit,
  wherein, in a case where the particular key is operated by a user while print processing is being suspended, the size information stored in the storage unit is not cleared and the suspended print processing is resumed.

9. A non-transitory computer-readable storage medium storing a computer program for causing a computer to execute steps of a method of controlling a printing apparatus, the method comprising steps of:
  detecting, when a sheet is fed from a sheet feeding unit of the printing apparatus, a size of the sheet during conveyance;
  storing information indicating the size detected in the detecting step in a storage unit of the printing apparatus, as size information indicating a size of a sheet stacked in the sheet feeding unit;
  controlling, in a case where execution of print processing is instructed in a state where the size information is stored in the storage unit, the execution of the print processing using the stored size information; and
  clearing, in a case where a particular key is operated by a user while print processing is not being suspended, the size information stored in the storage unit,
  wherein, in a case where the particular key is operated by a user while print processing is being suspended, the size information stored in the storage unit is not cleared and the suspended print processing is resumed.

* * * * *